United States Patent [19]

O'Donnell

[11] Patent Number: 5,476,098
[45] Date of Patent: Dec. 19, 1995

[54] PARTIALLY COHERENT IMAGING FOR LARGE-APERTURE PHASED ARRAYS

[75] Inventor: Matthew O'Donnell, Ann Arbor, Mich.

[73] Assignee: General Electric Company, Schenectady, N.Y.

[21] Appl. No.: 387,513

[22] Filed: Feb. 13, 1995

[51] Int. Cl.[6] ............................................. A61B 8/00
[52] U.S. Cl. ................................. 128/661.01; 73/597
[58] Field of Search ....................... 128/660.08, 660.07, 128/661.01; 73/596, 597, 602; 364/413.25

[56] References Cited

U.S. PATENT DOCUMENTS

| | | | |
|---|---|---|---|
| 5,278,757 | 1/1994 | Hoctor et al. | 364/413.25 |
| 5,345,939 | 9/1994 | Engeler et al. | 128/661.01 |
| 5,388,461 | 2/1995 | Rigby | 73/597 |

OTHER PUBLICATIONS

O'Donnell et al., "Optimum Displacement for Compound Image Generation in Medical Ultrasound", IEEE Trans. on Ultrasonics, Ferroelectronics and Frequency Control, vol. 35, No. 4, pp. 470–476.

Primary Examiner—George Manuel
Attorney, Agent, or Firm—Marvin Snyder

[57] ABSTRACT

Ultrasonic imaging performed with a large aperture phased array employs partially coherent processing to provide an improved real-time ultrasound image compared to that obtainable using either fully coherent or fully incoherent processing. Partially coherent processing is achieved by computing different sums across the imaging aperture and using a weighted total of the computed sums to generate a real-time image, enabling the operator to choose the extent of coherent summation versus incoherent summation across the aperture. Since coherent summation affects spatial resolution and incoherent summation affects contrast resolution, a trade-off between spatial and contrast resolution results in an optimal image for a given application.

19 Claims, 6 Drawing Sheets

PARTIALLY COHERENT IMAGING FOR LARGE-APERTURE PHASED ARRAYS

FIELD OF THE INVENTION

This invention generally relates to vibrational energy imaging systems and, more particularly, to a method and apparatus for imaging with vibrational energy using large-aperture phased arrays.

BACKGROUND OF THE INVENTION

Coherent summation across a phased array approximates the diffraction integral across a lens. Consequently, coherent summation can be used to spatially localize objects in a field. Incoherent summation across an array, however, does not spatially localize objects, but reduces the variance in scattering measurements since each group of array output signals represents an estimate of the scattering function obtained from a different (i.e., independent) view. Consequently, coherent processing of array data affects spatial resolution and incoherent processing affects contrast resolution.

Large-aperture phased arrays can be used to increase the spatial resolution in images produced by vibrational energy, such as ultrasound. However, coherence cannot be maintained over large apertures in many imaging applications in medicine, resulting in less than optimal spatial resolution.

SUMMARY OF THE INVENTION

One object of the invention is to utilize partially coherent processing with a large aperture phased array to provide an improved real-time ultrasound image under adverse imaging conditions, as compared to that obtainable using either fully coherent or fully incoherent processing.

The invention contemplates achieving partially coherent processing by computing different sums across the imaging aperture of a large aperture phased array ultrasound imaging system and then using more than one of those sums to generate a real-time image. In particular, a weighted sum of all possible array configurations is used. This processing approach exhibits different levels of spatial and contrast resolution depending on the extent of the coherent sum.

The foregoing approach permits the operator to choose the extent of coherent summation versus incoherent summation across the aperture. Since coherent summation affects spatial resolution and incoherent summation affects contrast resolution, the operator essentially trades off between spatial and contrast resolution to obtain the optimal image for a given application. Although ideally suited for a large fixed aperture, this method can also be used with a synthesized aperture such as a linear array.

The basic method of the invention can be used effectively in two different imaging situations. The first is the linear array case, used in radiology and obstetrics/gynecology, wherein each subsection of the summations is a full transmit-receive pattern from a large number of array elements. In such case, the active elements are stepped across the full array, and beams are swept over a range of angles at each position. Phase-sensitive data for each firing are stored, and images are generated in real time by summing the contributions from every firing at each pixel in the image plane.

The second imaging situation is the fixed-aperture condition used in cardiology wherein the array transmits the beam along a given direction, and subarray sectors are used as the subsections. The dimension of the transmit aperture is controlled by the form of the coherence function to ensure optimal performance.

Briefly, in accordance with a preferred embodiment of the invention, a vibrational energy imaging system comprises a multiplicity of transducers arranged in sequence to form an array, means for controlling the multiplicity of transducer elements to form N receive apertures, N being an integer, and means for forming a first plurality of coherent sums of baseband data acquired by the receive apertures. Each coherent sum of the first plurality is a summation of the baseband data produced by a first predetermined number of the receive apertures. First detecting means are provided for detecting a respective magnitude for each of the first plurality of coherent sums and for summing the respective magnitudes derived from the first plurality of coherent sums so as to form a first summed magnitude. Means are also provided for forming a second plurality of coherent sums of baseband data acquired by the receive apertures. Each coherent sum of the second plurality is a summation of the baseband data produced by a second predetermined number of the receive apertures, the second predetermined number being different than the first predetermined number. Second detecting means are provided for detecting a respective magnitude for each of the second plurality of coherent sums and for summing the respective magnitudes derived from the second plurality of coherent sums so as to form a second summed magnitude. A weighted summation comprising the product of a first weighting factor and the first summed magnitude and the product of a second weighting factor and the second summed magnitude is formed by summation means, and a pixel datum, which is a function of the weighted summation, is displayed by display means.

In accordance with another preferred embodiment of the invention, a vibrational energy imaging method for large-aperture phased arrays comprises controlling a multiplicity of transducer elements to form N receive apertures, where N is an integer. A first summed magnitude is determined for each pixel of an image to be displayed by processing baseband data produced by the receive apertures in accordance with a first array configuration, and a second summed magnitude is determined for each pixel to be displayed by processing baseband data produced by the receive apertures in accordance with a second array configuration that is different from the first array configuration. A weighted summation comprising the product of a first weighting factor and the first summed magnitude plus the product of a second weighting factor and the second summed magnitude is then formed, and a datum is displayed for each pixel which is a function of the weighted summation.

DETAILED DESCRIPTION OF THE PREFERRED EMBODIMENTS

Figure 1:
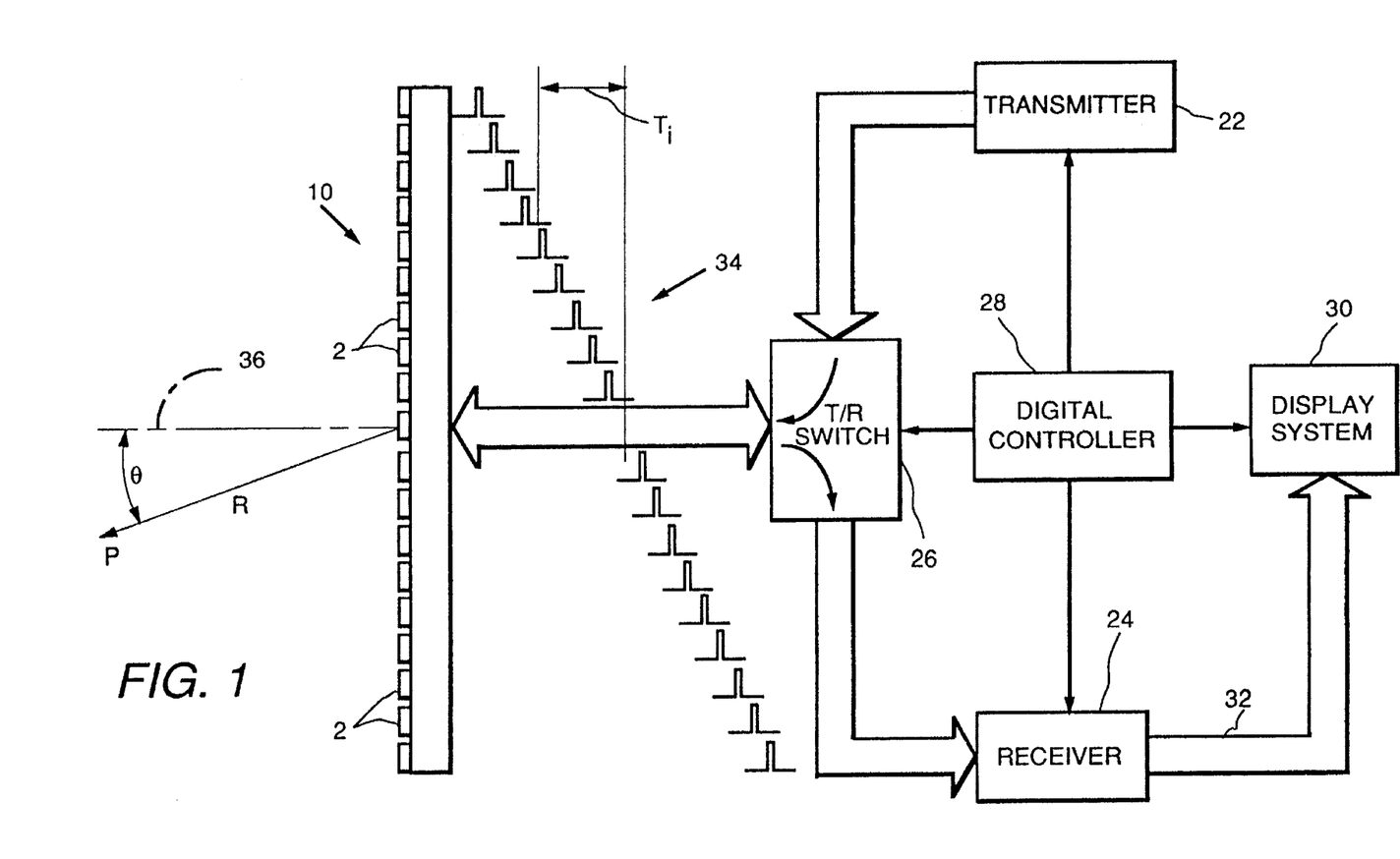
FIG. 1 is a block diagram of a conventional ultrasonic imaging system.

FIG. 1 illustrates a conventional vibrational energy (e.g., ultrasonic) imaging system including a transducer array 10 comprised of a plurality of separately driven transducers 12, each of which produces a burst of ultrasonic energy when energized by a pulsed waveform produced by a transmitter 22. The ultrasonic energy reflected back to transducer array 10 from the object under study is converted to an electrical signal by each receiving transducer 12 and applied separately to a receiver 24 through a set of transmit/receive (T/R) switches 26. Transmitter 22, receiver 24 and switches 26 are operated under control of a digital controller 28 responsive to commands by a human operator. A complete scan is performed by acquiring a series of echoes in which switches 26 are set to their transmit positions, transmitter 22 is gated ON momentarily to energize each transducer 12, switches 26 are then set to their receive positions, and the subsequent echo signals produced by each transducer 12 are applied to receiver 24. The separate echo signals from each transducer 12 are combined in receiver 24 to produce a single echo signal which is used to produce a line in an image on a display system 30.

Transmitter 22 drives transducer array 10 such that the ultrasonic energy produced is directed, or steered, in a beam. To accomplish this, transmitter 22 imparts a time delay $T_i$ to the respective pulsed waveforms 34 that are applied to successive transducers 12. By adjusting the time delays $T_i$ appropriately in a conventional manner, the ultrasonic beam can be directed away from axis 36 (which is normal to the face of the transducer at the center of array 10) by an angle $\theta$ and/or focused at a fixed range R. A sector scan is performed by progressively changing the time delays $T_i$ in successive excitations. The angle $\theta$ is thus changed in increments to steer the transmitted beam in a succession of directions.

The echo signals produced by each burst of ultrasonic energy reflect from objects located at successive ranges along the ultrasonic beam. The echo signals are sensed separately by each transducer 12 and a sample of the magnitude of the echo signal at a particular point in time represents the amount of reflection occurring at a specific range. Due to differences in the propagation paths between a reflecting point P and each transducer 12, however, these echo signals will not be detected simultaneously and their amplitudes will not be equal. Receiver 24 amplifies the separate echo signals, imparts the proper time delay to each, and sums them to provide a single echo signal which accurately indicates the total ultrasonic energy reflected from point P located at range R along the ultrasonic beam oriented at an angle $\theta$.

To simultaneously sum the electrical signals produced by the echoes impinging on each transducer 12, time delays are introduced into each separate transducer channel 110 (shown in FIG. 2) of receiver 24. The beam time delays for reception are the negatives of the respective transmission time delays when measured from the time of the central element. The time delay of each receiver channel continuously changes during reception of the echo to provide dynamic focusing of the received beam at the range R from which the echo signal emanates.

Under direction of digital controller 28, receiver 24 provides delays during the scan such that steering of receiver 24 tracks the direction $\theta$ of the beam steered by transmitter 22 and samples the echo signals at a succession of ranges R and provides the proper delays and phase shifts to dynamically focus at points P along the beam. Thus each emission of an ultrasonic pulse waveform results in acquisition of a series of data points which represent the amount of reflected sound from a corresponding series of points P located along the ultrasonic beam. Demodulation can occur either before or after the individual received signals are summed together.

Figure 2:
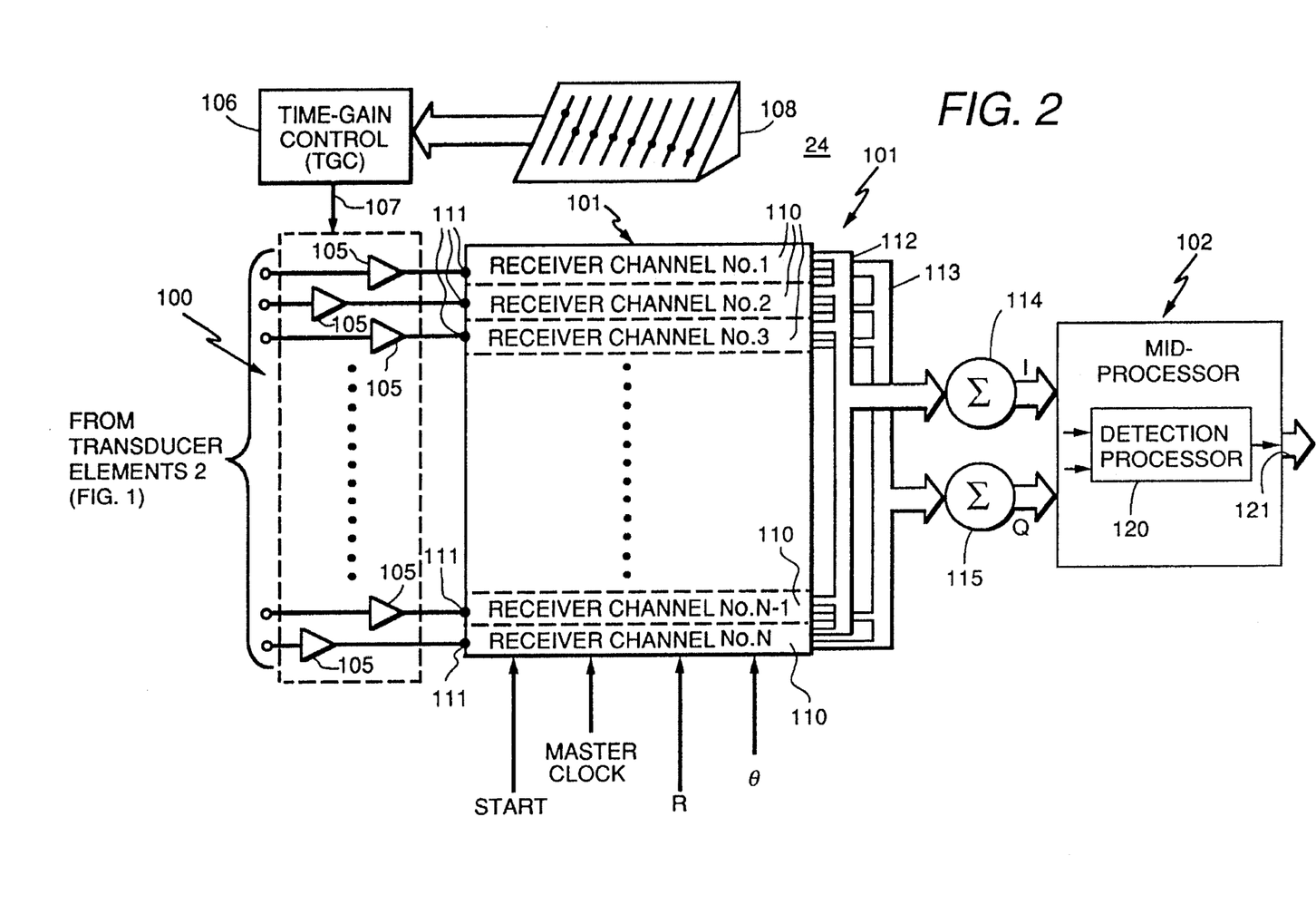
FIG. 2 is a block diagram of a conventional receiver which forms part of the system of FIG. 1.

FIG. 2 shows conventional receiver 24 as comprising three sections: a time-gain control section 100, a receive beamforming section 101 and a midprocessor 102. Time-gain control (TGC) section 100 includes a respective amplifier 105 for each of receiver channels 110 and a time-gain control circuit 106. The input of each amplifier 105 is connected to a respective one of transducers 12 (shown in FIG. 1) to amplify the echo signal which it receives. The amount of amplification provided by amplifiers 105 is controlled through a control line 107 that is driven by TGC circuit 106, the latter being set by hand operation of potentiometers 108.

The receive beamforming section 101 of receiver 24 includes separate receiver channels 110, each receiving the analog echo signal from a respective one of amplifiers 105 at an input 111. Each amplified signal is conveyed to a pair of quadrature detectors in the respective receiver channel, where the phases of the mixing reference frequency differ by 90°. Since this reference frequency is made identical to that of the transmitted pulses, output signals from low-pass filters in the receiver channel become the complex Doppler frequencies that have been shifted by Doppler effect, and the pair of output signals also become complex signals (I and Q) with phases that differ by 90°. These signals are produced as a stream of digitized output values on an I bus 112 and a Q bus 113. Each of these I and Q baseband signals represents a demodulated sample of the echo signal envelope at a specific range R. These samples have been delayed such that when they are summed at summing points 114 and 115 with the I and Q samples from each of the other receiver channels 110, the summed signals indicate the magnitude and phase of the echo signal reflected from a point P located at range R on the beam steered at angle $\theta$.

Mid-processor 102 receives the beam samples from summing points 114 and 115. The I and Q values of each beam sample are signals representing the in-phase and quadrature components of the magnitude of reflected sound from a point (R, $\theta$). A detection processor 120 receives the summed I and Q values and produces an output signal of magnitude $|A|=(I^2+Q^2)^{1/2}$.

Figure 3:
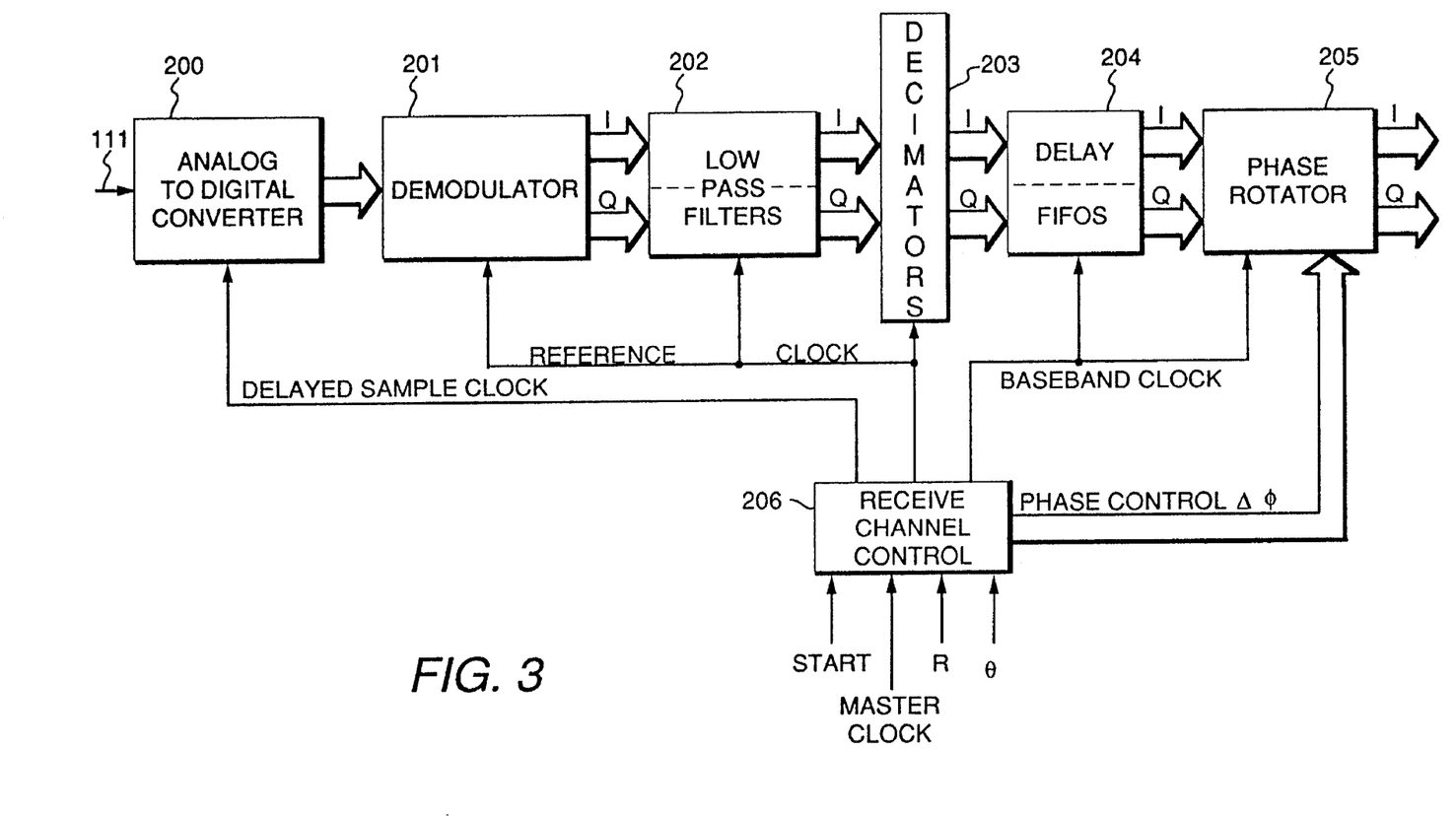
FIG. 3 is a block diagram of a conventional receiver channel which forms part of the receiver of FIG. 2.

Each receiver channel, as shown in FIG. 3, is responsive to a START command, a master clock, a beam angle signal $\theta$ and a range signal R from digital controller 28 (FIG. 1) to perform the digital beamforming functions which include: sampling the analog input signal 111 in an analog-to-digital converter 200; demodulating the sampled signal in a demodulator 201; filtering out the high-frequency sum signals produced by demodulator 201 with low pass filters 202; reducing the data rate in decimators 203; and time-delaying and phase-adjusting the resulting digital data stream in delay FIFOs (i.e., first-in/first-out memories) 204 and phase rotator 205, respectively. Elements 200–205 are controlled by a receive channel control 206 which produces the required clock and control signals in response to commands from digital controller 28 (FIG. 1). The echo signal envelope represented by the demodulated and decimated digital samples is delayed by delay FIFOs 204 and phase-shifted by phase rotator 205 to provide the desired beam steering and beam focusing. As indicated in FIG. 1, display system 30 receives the series of data points produced by receiver 24 and converts the data into the desired image.

Although not shown in FIGS. 1–3, the conventional digital baseband imaging system has a number of transducer elements greater than the number of receiver channels. Therefore, the receive aperture is made up of less than all of the transducer elements. For a linear array, the receive aperture is stepped across the transducer array. If the stepping interval is less than the length of the receive aperture, the successive receive apertures will overlap. For a fixed aperture array, the transducer elements are grouped into a plurality of nonoverlapping receive apertures. FIGS. 1–3 represent the receive signal processing for a single receive aperture comprised of a plurality of transducer elements.

In conventional coherent vibrational energy imaging, a summed receive signal is produced for each receive aperture. The summed receive signals are in turn summed before being provided to the magnitude detector. Conversely, in conventional incoherent vibrational energy imaging, the summed receive signal produced for each receive aperture is supplied separately to the magnitude detector and then the resulting magnitudes are summed. Whether coherent or incoherent summation should be used depends on the spatial and contrast resolution required for a particular application. Coherent summation can be used to spatially localize objects in a field. In contrast, incoherent summation across an array does not spatially localize objects, but reduces the variance in scattering measurements since each array output signal represents an estimate of the scattering function obtained from a different (i.e., independent) view. Consequently, coherent processing of array data affects spatial resolution and incoherent processing affects contrast resolution.

Figure 4A:
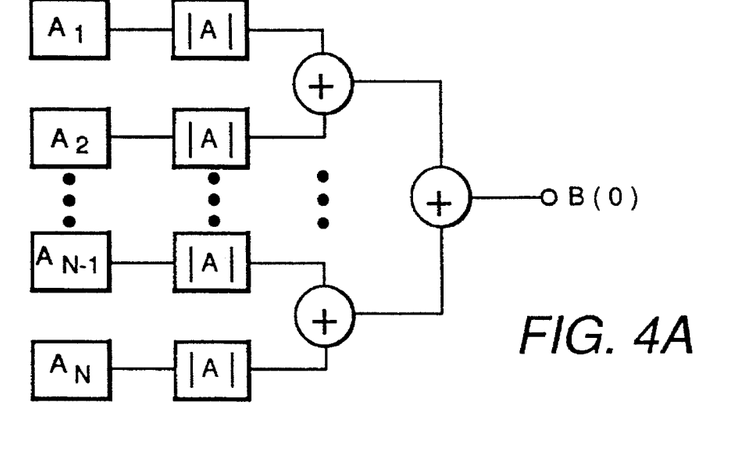
FIG. 4A is a block diagram showing fully incoherent summation of signals across the imaging aperture of a phased array of transducer elements.
Figure 4B:
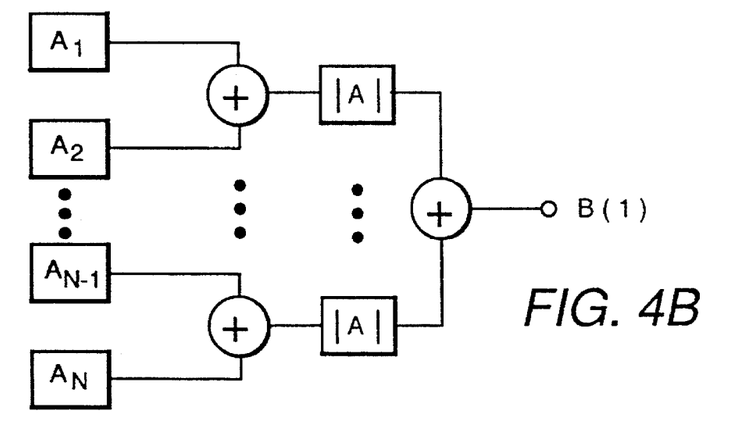
FIG. 4B is a block diagram showing partially coherent summation of signals across the imaging aperture of a phased array of transducer elements.
Figure 4C:
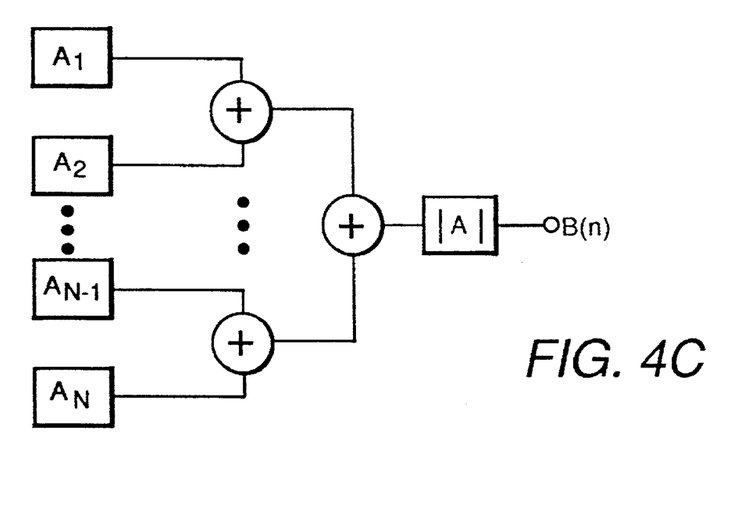
FIG. 4C is a block diagram showing fully coherent summation of signals across the imaging aperture of a phased array of transducer elements.

In accordance with the present invention, trading off between coherent and incoherent processing is used to achieve a trade-off between spatial and contrast resolution in a real-time image. The starting point for designing an optimal strategy to trade off coherent and incoherent processing is shown in FIGS. 4A–4C. Each diagram in FIGS. 4A–4C represents a way of computing a sum across the imaging aperture. Each of the blocks labeled $A_1$ through $A_N$ represents a separate subsection of the array, each constituting a separate respective receive aperture.

In the method of FIG. 4A, the detected output signal from each subsection of the array is summed, resulting in the array output signal labeled B(0). This processing is incoherent, with the spatial resolution determined solely by the diffraction pattern of a single subsection of the array.

In the method of FIG. 4B, the output signals from two neighboring subsections of the array are summed coherently. The detected output signals of both of these sections are summed across the array, resulting in output signal B(1). For this condition, the spatial resolution is determined by the diffraction pattern of two neighboring subsections of the array.

Full coherent processing, represented in FIG. 4C, results in a spatial resolution determined by the diffraction pattern of the whole aperture. The processing approaches presented in FIGS. 4A–4C exhibit different levels of spatial and contrast resolution, depending on the extent of the coherent sum.

In the conventional imaging systems, one of the methods presented in FIGS. 4A and 4C, i.e., full coherent processing, is usually used to generate real-time images. The present invention, however, employs all the sums presented in FIGS. 4A and 4C to generate a real-time image, as shown in FIG. 4B. In particular, a weighted sum of all possible array configurations, such as $$B = \sum_{i=0}^{n} K(i)B(i) \qquad (1)$$

is used to trade-off spatial and contrast resolution. In Eq. (1) the index i represents a coherence length and the resulting array sums B(i) are associated with coherent sums across $2^i$ subsections. The constants K(i) represent the coherence function, where a sharp peak in K at i=n is a fully coherent aperture and a sharp peak in K at i=0 is a fully incoherent aperture. To ensure proper normalization, the coherence function must satisfy the following constraint:

$$\sum_{i=0}^{n} K(i) = 1 \qquad (2)$$

The method of the present invention allows the operator to vary the coherence function in real-time, subject to the constraint presented in Eq. (2).

Figure 5A:
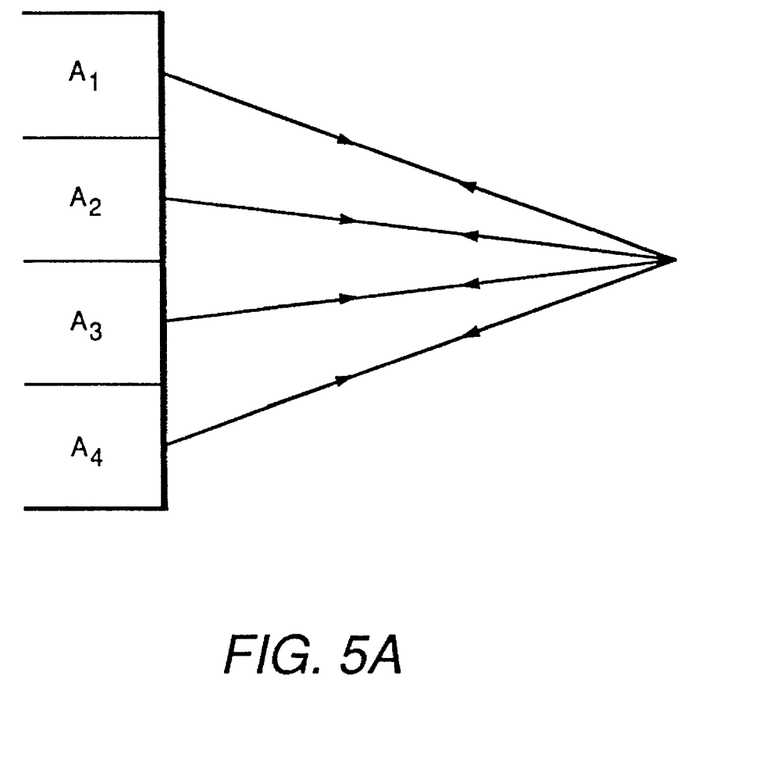
FIG. 5A is a schematic diagram of a linear array of transducer elements wherein each subsection is a full transmit-receive pattern from a large number of transducer array elements to produce a stepped imaging aperture.
Figure 5B:
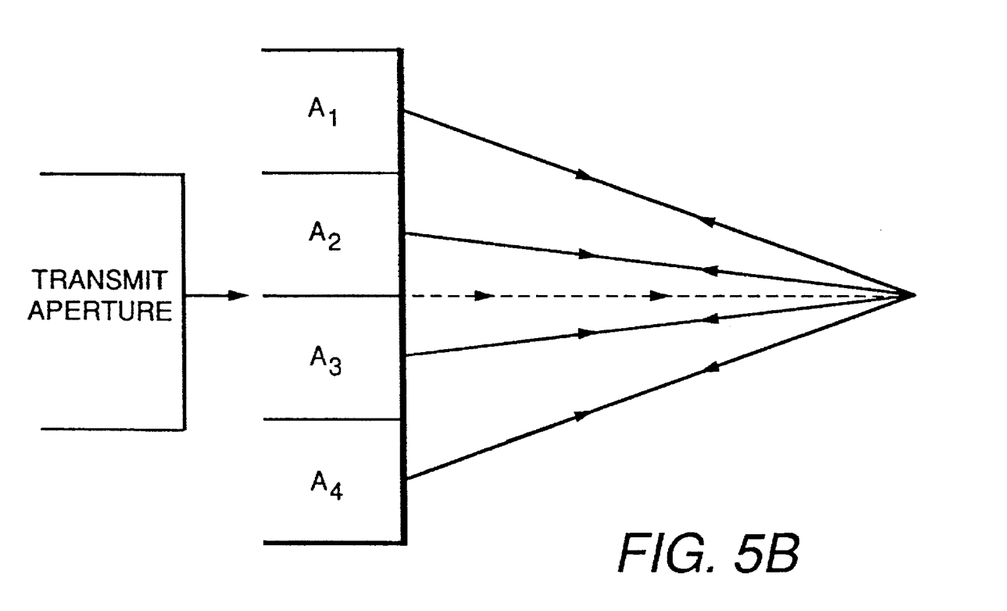
FIG. 5B is a schematic diagram of the fixed aperture condition wherein nonoverlapping subsections of transducer elements receive reflections from the same point during one firing.

The basic method described above can be implemented effectively in two different imaging situations, as illustrated in FIGS. 5A and 5B for n=2 (i.e., $N=2^n=4$).

FIG. 5A represents the linear array condition used in radiology and obstetrics/gynecology wherein each subsection ($A_1 \ldots A_4$) of the summations presented in FIGS. 4A–4C is a full transmit-receive pattern from a large number of array elements (e.g., 64 to 128 elements). In this condition, the active elements are stepped across the full array, and beams are swept over a range of angles at each position. Phase-sensitive data for each firing are stored, and images are generated in real time by summing the contributions from every firing at each pixel in the image plane. For this condition, the individual subsections contributing to the possible sums produced by the methods of FIGS. 4A–4C represent overlapping apertures, since the active area of the array is stepped at much smaller increments than the dimension of the active aperture. Also, the number of subsections can be much greater than 4 because of the large number of overlapping measurements.

FIG. 5B illustrates the fixed-aperture condition used in cardiology. In this condition, the array transmits the beam along a given direction, and subarray sectors, each including about 16 to 32 elements, are used as the subsections shown in FIGS. 4A–4C. The transmit aperture dimension is controlled by the form of the coherence function to ensure optimal performance. For example, a very small transmit aperture is used for fully incoherent processing and the complete array is used to transmit for fully coherent processing. The number of subsections contributing to the sums of FIGS. 4A–4C is fixed at 4 for this example.

Figure 6:
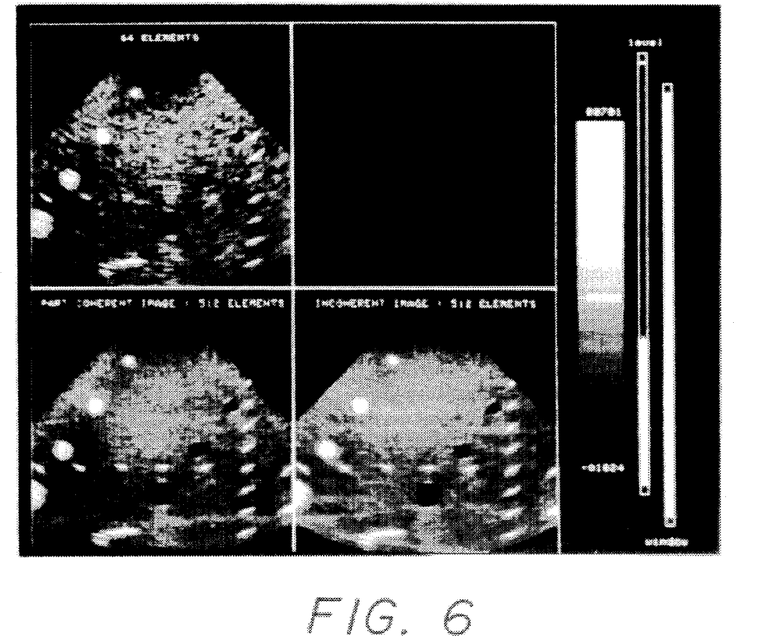
FIG. 6 shows partially coherent, fully incoherent and fully coherent images generated during testing of the invention.
Figure 7:
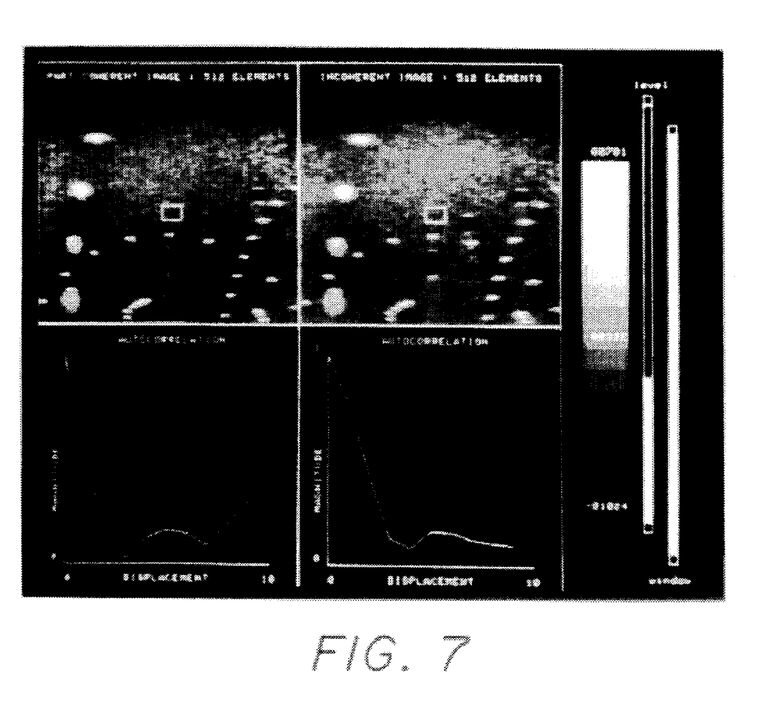
FIG. 7 is a comparison of the spatial autocorrelation function for the partially coherent and fully incoherent images.

To test the efficacy of the invention described herein, images of a phantom were made using a 64-element, 3.3-MHz array as the active aperture. The aperture was stepped through eight positions separated by intervals equal to ½ of the array length, i.e., by the distance occupied by 32 elements. Phased array images of a phantom were generated at each of the eight positions. The images were then recombined employing all the sums presented according to the method set forth in FIG. 4B and Eq. (1). In FIG. 6, the partially coherent image generated with the coherence functions $K(0)=0$, $K(1)=0.75$, $K(2)=0.25$, $K(3)=0$ is compared to the fully incoherent image obtained from the same data using the coherence functions $K(0)=1$, $K(1)=K(2)=K(3)=0$ and to a conventional 64-element phased array image of the same object. Both the fully incoherent image and the partially coherent image are much better than the original 64-element phased array picture. However, the partially coherent image exhibits better spatial resolution and a finer texture pattern than that exhibited by the fully incoherent image. This improvement in spatial resolution is illustrated in FIG. 7, which compares the spatial autocorrelation function in a uniform texture region for the two images. The top images in FIG. 7 represent the raw R, θ image data prior to scan conversion, and the rectangles shown therein identify the region used for the correlation analysis. As is evident from the autocorrelation graphs shown in FIG. 7, the spatial resolution in the partially coherent image is greatly improved over that of the fully incoherent image, especially at the larger displacements from the array axis.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A vibrational energy imaging system comprising:

a plurality of transducers arranged in sequence to form an array;

transmission means for selectively activating said transducers to produce propagating vibrational energy pulses;

receiver means for forming first through fourth sets of baseband samples of the echo signal envelope from a point at a specified range and angle in response to detection of reflected vibrational energy pulses by selected transducers of first through fourth receive apertures respectively, each set of said baseband samples comprising in-phase and quadrature components of the magnitude of the reflected vibrational energy pulse received from said point by said first through fourth receive apertures, respectively;

first summation means for summing the in-phase components of said first and second sets of baseband samples to form a first summed in-phase baseband signal;

second summation means for summing the quadrature components of said first and second sets of baseband samples to form a first summed quadrature baseband signal;

third summation means for summing the in-phase components of said third and fourth sets of baseband samples to form a second summed in-phase baseband signal;

fourth summation means for summing the quadrature components of said third and fourth sets of baseband samples to form a second summed quadrature baseband signal;

first signal processing means for producing a first signal magnitude in response to detection of said first summed in-phase baseband signal and said first summed quadrature baseband signal;

second signal processing means for producing a second signal magnitude in response to detection of said second summed in-phase baseband signal and said second summed quadrature baseband signal;

fifth summation means for summing said first and second signal magnitudes; and means for displaying a pixel datum as a function of said summed first and second magnitudes.

2. The vibrational energy imaging system of claim 1 wherein said first through fourth receive apertures are overlapping, the transducers of each of said first through fourth receive apertures also forming a corresponding transmit aperture.

3. The vibrational energy imaging system of claim 1 wherein said first through fourth receive apertures are nonoverlapping and the transmit aperture is fixed for said first through fourth receive apertures.

4. An ultrasound imaging method for large-aperture phased arrays, comprising the steps of:

controlling a multiplicity of transducer elements to form N receive apertures, where N is an integer;

forming a first plurality of coherent sums of baseband data acquired by said receive apertures, each coherent sum of said first plurality being a summation of baseband data produced by a respective subset consisting of a first predetermined number of said receive apertures;

detecting a respective signal magnitude for each of said first plurality of coherent sums;

summing the respective signal magnitudes obtained from said first plurality of coherent sums to form a first summed magnitude;

forming a second plurality of coherent sums of baseband data acquired by said receive apertures, each coherent sum of said second plurality being a summation of baseband data produced by a respective subset consisting of a second predetermined number of said receive apertures, said second predetermined number being different from said first predetermined number;

detecting a respective signal magnitude for each of said second plurality of coherent sums;

summing the respective signal magnitudes obtained from said second plurality of coherent sums to form a second summed magnitude;

forming a weighted summation comprising the product of a first weighting factor and said first summed magnitude plus the product of a second weighting factor and said second summed magnitude; and displaying a pixel datum as a function of said weighted summation.

5. The method of claim 4 including the additional step of forming a respective weighted summation for each pixel of an image frame to be displayed.

6. The method of claim 4 wherein said N receive apertures are overlapping, the transducer elements of each of said receive apertures also forming a corresponding transmit aperture.

7. The method of claim 4 wherein said N receive apertures are nonoverlapping and the transmit aperture is fixed for said N receive apertures.

8. The method of claim 4 wherein said N receive apertures are overlapping and distributed over a two-dimensional array of said transducer elements, the transducer elements of each of said receive apertures also forming a corresponding transmit aperture.

9. The method of claim 4 wherein said N receive apertures are nonoverlapping and distributed over a two-dimensional array of said transducer elements, and the transmit aperture is fixed over the two-dimensional array for said N receive apertures.

10. An ultrasound imaging method for large-aperture phased arrays, comprising the steps of:

controlling a multiplicity of transducer elements to form N receive apertures, where N is an integer;

determining a first summed magnitude for each pixel of an image to be displayed by processing baseband data produced by said receive apertures in accordance with a first array configuration;

determining a second summed magnitude for said each pixel by processing baseband data produced by said receive apertures in accordance with a second array configuration, said second array configuration being different from said first array configuration;

forming a weighted summation comprising the product of a first weighting factor and said first summed magnitude plus the product of a second weighting factor and said second summed magnitude; and displaying a datum for said each pixel which is a function of said weighted summation.

11. The method of claim 10 wherein one of said first and second array configurations produces a fully incoherent summation of baseband data.

12. The method of claim 10 wherein one of said first and second array configurations produces a fully coherent summation of baseband data.

13. The method of claim 10 wherein at least one of said first and second array configurations produces a partially coherent summation of baseband data.

14. The method of claim 10 comprising the additional step of:

determining a third summed magnitude for said each pixel by processing baseband data produced by said receive apertures in accordance with a third array configuration, said third array configuration being different from either of said first and second array configurations, wherein said weighted summation is increased by addition of the product of a third weighting factor and said third summed magnitude.

15. The method of claim 10 wherein the number of different array configurations equals n, n being an integer greater than or equal to 2, and further including the steps of determining n additional summed magnitudes for said each pixel; said weighted summation having n terms, each of said n terms being the product of a respective weighting factor and a respective one of said n summed magnitudes, the number of weighting factors being equal to n and the sum of said n weighting factors being equal to unity.

16. The method of claim 10 wherein said N receive apertures are overlapping, the transducer elements of each of said receive apertures also forming a corresponding transmit aperture.

17. The method of claim 10 wherein said N receive apertures are nonoverlapping and the transmit aperture is fixed for said N receive apertures.

18. A vibrational energy imaging system comprising:

a multiplicity of transducers arranged in sequence to form an array;

means for controlling said multiplicity of transducer elements to form an integral number of receive apertures;

means for forming a first plurality of coherent sums of baseband data acquired by said receive apertures, each coherent sum of said first plurality being a summation of the baseband data produced by a respective subset consisting of a first predetermined number of said receive apertures;

means for detecting a respective signal magnitude for each of said first plurality of coherent sums;

means for summing the respective signal magnitudes derived from said first plurality of coherent sums to form a first summed magnitude;

means for forming a second plurality of coherent sums of baseband data acquired by said receive apertures, each coherent sum of said second plurality being a summation of the baseband data produced by a respective subset consisting of a second predetermined number of said receive apertures, said second predetermined number being different from said first predetermined number;

means for detecting a respective signal magnitude for each of said second plurality of coherent sums;

means for summing the respective signal magnitudes derived from said second plurality of coherent sums to form a second summed magnitude;

means for forming a weighted summation comprising the product of a first weighting factor and said first summed magnitude plus the product of a second weighting factor and said second summed magnitude; and means for displaying a pixel datum as a function of said weighted summation.

19. The system of claim 18 further comprising means for selecting said first and second weighting factors.

* * * * *